United States Patent [19]

Spitz et al.

[11] Patent Number: 5,513,304
[45] Date of Patent: Apr. 30, 1996

[54] METHOD AND APPARATUS FOR ENHANCED AUTOMATIC DETERMINATION OF TEXT LINE DEPENDENT PARAMETERS

[75] Inventors: A. Lawrence Spitz, Palo Alto; Antonio P. Dias, Sunnyvale, both of Calif.

[73] Assignees: Xerox Corporation, Stamford, Conn.; Fuji Xerox Corporation, Japan

[21] Appl. No.: 191,895

[22] Filed: Feb. 4, 1994

Related U.S. Application Data

[63] Continuation-in-part of Ser. No. 47,514, Apr. 19, 1993, Pat. No. 5,384,864.

[51] Int. Cl.[6] .................................................. G06K 9/34
[52] U.S. Cl. .................................... 395/144; 382/295
[58] Field of Search .................................... 395/144, 150; 382/45, 8, 9, 22, 48, 18

[56] References Cited

U.S. PATENT DOCUMENTS

| | | | |
|---|---|---|---|
| 4,377,803 | 3/1983 | Lotspiech et al. | 382/9 |
| 4,516,265 | 5/1985 | Kizu et al. | 382/9 |
| 4,899,394 | 2/1990 | Lee | 382/9 |
| 4,903,311 | 2/1990 | Nakamura | 382/18 X |
| 4,918,740 | 4/1990 | Ross | 382/9 |
| 5,001,766 | 3/1991 | Baird | 382/46 |
| 5,062,141 | 10/1991 | Nakayama et al. | 382/9 |
| 5,093,868 | 3/1992 | Tanaka et al. | 382/9 |
| 5,167,016 | 11/1992 | Bagley et al. | 395/144 |
| 5,253,307 | 10/1993 | Wayner et al. | 382/22 |
| 5,263,133 | 11/1993 | Hyakutake et al. | 395/144 X |
| 5,276,793 | 1/1994 | Borgendale et al. | 395/144 X |
| 5,384,864 | 1/1995 | Spitz | 382/9 |

*Primary Examiner*—Heather R. Herndon
*Assistant Examiner*—Cliff N. Vo
*Attorney, Agent, or Firm*—Oliff & Berridge

[57] ABSTRACT

An automatic character cell determining apparatus automatically determines the character cells within the text image of a document. A connected component generator means generates connected components from the pixels comprising the text image. An aligning device aligns skewed and warped lines to the proper image axes. A bounding box generator generates a bounding box surrounding each connected component. A character cell determining device for locating character cells including one or more connected components has a vertical splaying device and a horizontal splaying device for ensuring white spaces between lines and connected components, a vertical profile device for determining the vertical positions of a line, a splitting device for splitting ligatures of two or more connected components and a character cell generator for generating character cells grouping together one or more connected components.

40 Claims, 10 Drawing Sheets

FIG. 1

*These lines of text are skewed*
*These lines of text are skewed*

FIG. 2A

These lines of text are skewed

These lines of text are skewed

FIG. 2B

Fuji Xerox Palo Alto Laboratory
3400 Hillview Avenue
Palo Alto, CA 94304 USA

This line of text droops at the end

FIG. 4A

This line of text drooPs at the end

FIG. 4B

This line of text droops at the end

FIG. 8 seized. Confidence in the international monetary system was shaky enough before last week's action. Since 1973, the nearly tenfold increase in oil prices has

FIG. 6A seized. Confidence in the international monetary system was shaky enough before last week's action. Since 1973, the nearly tenfold increase in oil prices has

FIG. 6B seized. Confidence in the international monetary system was shaky enough before last week's action. Since 1973, the nearly tenfold increase in oil prices has

FIG. 7A seized. Confidence in the international monetary system was shaky enough before last week's action. Since 1973, the nearly tenfold increase in oil prices has

Fuji Xerox Palo Alto Laboratory
3400 Hillview Avenue
Palo Alto, CA 94304 USA seized confidence in the International
monetary system was shaky enough to
for last week's action. Since 1983 the
nearly tenfold increase in oil prices.

FIG. 10

METHOD AND APPARATUS FOR ENHANCED AUTOMATIC DETERMINATION OF TEXT LINE DEPENDENT PARAMETERS

BACKGROUND OF THE INVENTION

This is a Continuation-in-Part of U.S. application Ser. No. 08/047,514, fled Apr. 19, 1993, now U.S. Pat. No. 5,384,864, issued Jan. 24, 1995.

FIELD OF THE INVENTION

This invention relates to a method and apparatus for automatic document recognition. More particularly, this invention relates to an enhanced method for automatically determining the text line spatial features within a document. Specifically, this invention is directed to a method for transforming skewed, distorted or low resolution document images into useful image sources, specifically so that the text lines can be quickly and robustly identified. The method is robust in the presence of skew and line warpage, and is photocopy-induced-noise tolerant. In addition, this invention further reduces the computational and memory demands by replacing text splaying with text shrinking.

DESCRIPTION OF RELATED ART

Optical character recognition and the use of optical character recognition to convert scanned image data into text data suitable for use in a digital computer is well known. In addition, methods for converting scanned image data into text data and the types of errors such methods generate are well known. Various problems in converting scanned image data into text data lies in being able to distinguish the individual lines of text from each other, in being able to distinguish words grouping within a single line of text, in determining the vertical and horizontal extents of the character cells within a single line of text, and in properly separating ligatures or kerns between connected components in a single line of text.

These problems, difficult to solve alone, often become impossible when the actual text lines of the image to be recognized are skewed, warped or full of noise. That is, locating the text lines is difficult, if not impossible, when: 1) the lines are not aligned with an axis of the image on the document, or are not parallel to each other (skew); 2) the lines are not straight (warp); or 3) the lines contain image components which are not actually part of the image to be recognized, or the characters of the line are distorted (noise).

In U.S. patent application Ser. No. 08/047,514 (U.S. Pat. No. 5,384,864) to Spitz, incorporated herein, a method for identifying the bottom, top, baseline and x-line positions of a text line is described. In general, this application isolated the lines, words and characters of an image by vertically splaying the full-sized connected components to identify individual lines, and then using horizontal splaying to identify individual character and word groupings of connected components.

According to the method set forth in Spitz '514, a plurality of bounding boxes surrounding a plurality of connected components of a text portion of an image of a document are generated. The bounding boxes (and connected components) are then splayed in the vertical direction to separate any overlaps between the bounding boxes of a current line and the bounding boxes of the lines vertically adjacent to the current line. A vertical profile of the connected components of each line is generated and the top and bottom peaks are located. Individual vertical profiles of the bottom and top regions of the connected components are generated to determine the baseline and x-line positions, respectively. Once each line of the text portion is identified, the bounding boxes (and connected components) are then horizontally splayed to eliminate any overlaps of the bounding boxes within the current line. For each line, a modal stroke width value of the connected components of that line is determined. The actual stroke widths of the connected components are compared to this modal stroke width. If any connected component has an actual stroke width greater than a predetermined multiple of the modal stroke width, then each such connected component is considered to be a possible ligature of two or more independent connected components. In this case, the connected components may be split. Such ligatures are recursively split until no further splits are possible. Once all possible splits have been made, the spaces between connected adjacent components are then analyzed to determine the word and character spacings of each line.

Once the text portion of the image is splayed so that the connected components are unambiguously separated vertically and horizontally from surrounding connected components, each group of connected components which are between the top and bottom positions of each line and are vertically aligned are grouped together as a character into one character cell.

However, this method is insufficiently robust when dealing with text images which are skewed, warped or noisy. Such images are often created when photocopying an original image. The copy image will often be skewed to the axes of the sheet on which it is formed. In addition, if the original image was taken from a book, the lines at the portion near the spine will be warped by a characteristic curvature known as gutter distortion. Finally, the photocopy process can impart a number of different kinds of noise. First, the resolution of the copy may be quite low compared to the original image. Thus, outline contours of the characters in the copy image will be distorted, and will contain noise due to inadvertently (or purposefully) dropped or added image pixels within the character. Second, the copying process may add completely spurious groups of image pixels due to debris on the copy window or defects in the photoreceptor or other elements of the copier.

SUMMARY OF THE INVENTION

This invention therefore provides an optical character recognition system having enhanced text line, word and character cell feature recognition capabilities.

This invention also automatically determines the text line, word and character cell spatial features of a document when the text line is distorted through one or more of skew, warpage or noise.

This invention also provides for a system which allows lines which are skewed or warped to be aligned with an image axis.

This invention further provides for a system which identifies image line, image word and image characters with reduced computational and memory requirements.

This invention further provides for the reduced computational and memory requirements by selectively shrinking the dimensions of connected components of the image about the center of a bounding box formed around the connected components.

In a first embodiment of this invention, a bitmap of an image is converted into a list of connected components. Then, the dominant orthogonal axes of the image are determined, and the image axes are aligned to the analysis axes. Next, any remaining lines which are skewed to the dominant axes of the image are translated into alignment with the image axes.

Then, similarly, any line portions which are warped are translated into alignment with the image axes. Any time the connected components are translated into alignment, a small rotation is imposed on these connected components. While the system is generally insensitive to small rotations, the rotated connected components can be compensated for so they optimally align to the image axes.

Once all of the connected components are aligned to the image axes, bounding boxes are generated around each connected component, and centers of the bounding boxes are located. Then, each bounding box is shrunk around its center in the vertical direction to separate the image into individual lines. The connected components belonging to each line are then identified.

Then, for each line, a modal baseline is determined, and each baseline connected component of that line is aligned with the modal baseline. This is done with the descenders, if any, masked. Once all of the connected components are aligned to the baseline, the descenders are unmasked and realigned to properly descend from the baseline. At this point, the x-line, bottom line and top line parameters for each line are determined relative to the already determined baseline.

Next, the word grouping and character grouping of the connected components are determined. First, each bounding box of the current line is shrunk around its center in the horizontal direction to separate the bounding boxes from each other. Then, the location and relative numbers of the differently sized leading between the bounding boxes is analyzed to find one or more peaks indicating one or more of the intrawords spaces or the interword spaces.

Once the inter- and/or intraword spaces are found, any sufficiently wide connected component is analyzed to separate any accidentally or intentionally kerned characters.

BRIEF DESCRIPTION OF THE DRAWINGS

The invention is described in relation to the accompanying drawings, in which.

DETAILED DESCRIPTION OF THE PREFERRED EMBODIMENTS

Figure 1:
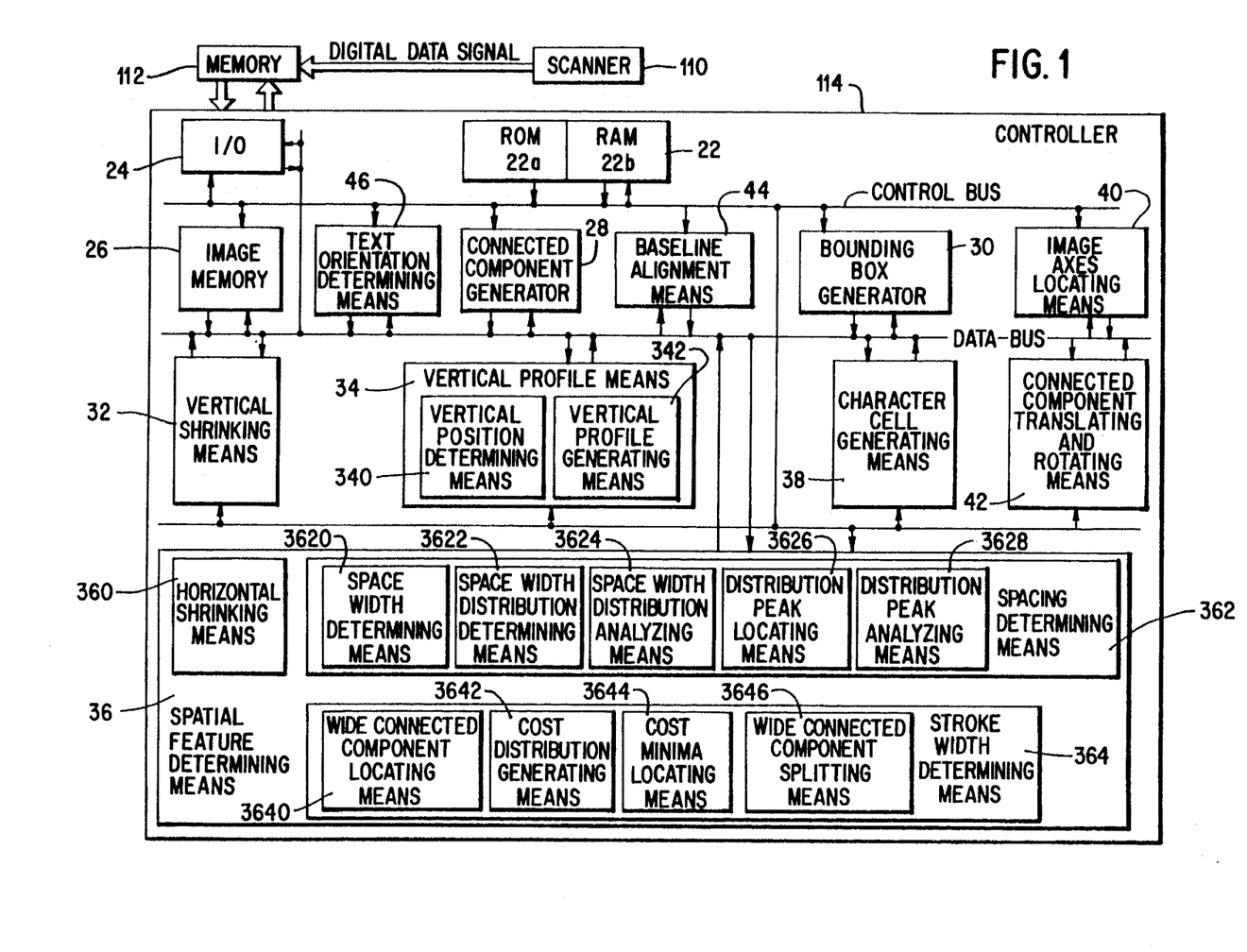
FIG. 1 shows a block diagram of an optical character recognition system.

As shown in FIG. 1, the optical character recognition system of the present invention comprises a scanner 110 having a charge coupled device (CCD) or the like. The scanner 110 scans a document having an image, the image comprising a text portion of an unknown script and language. The scanner 110 outputs a digital data signal representative of the location and image density of a plurality of pixels comprising the image of the original document. This digital data signal is sent to a memory 112, where it is stored temporarily or indefinitely. The digital data signal, when output from the memory 112, is input to a general purpose digital computer 114. Once input to computer 114, the digital data signal is first cleaned up by removing any non-text portions of the image, leaving the text portion. The cleaned up digital data signal is then restored to the memory 112 or stored in a memory of the computer 114.

As shown in FIG. 1, the general purpose digital computer 114 of the present invention comprises a memory 22 for storing a control program, an input/output circuit 24 for inputting the digital data signal from the memory 112 and for outputting a signal representative of the determined character cells of the text portion. The general purpose computer 114 also comprises an image RAM 26 for storing the digital data signal; a connected component generating means 28 for generating connected components from the digital data signal; bounding box generating means 30 for determining the coordinates of the bounding box and the pixels of the digitized image within the bounding box for each of the connected components; a vertical shrinking means 32 for vertically shrinking the text portion; vertical profile means 34 for generating a vertical profile of the unshrunk text portion; spatial feature determining means 36 for horizontally shrinking the text portion; character cell generating means 38 for grouping connected components into character cells and for identifying character and word divisions; an image axes locating means 40 for aligning the dominant axes of the image with the analysis axis; a connected component translating and rotating means 42 and a baseline alignment means 44 for aligning the connected components of a line with the line's baseline position, and for removing rotations imposed on the connected components, should it become necessary to do so; and a text orientation determining means 46 for determining the orientation of the dominant axes of the image. The vertical profile means 34 comprises a vertical profile generating means 340 for generating vertical profiles of the text portion, each line of the text portion and portions of each line, and a vertical position determining means 342 for determining at least the top, bottom, baseline and possibly the x-line positions of each line. The line spatial feature determining means 36 comprises a horizontal shrinking means 360 for horizontally shrinking each line of the text portion, spacing determining mean 362 for determining the interword and intraword spaces within each line of the text portion, and stroke width determining means 364 for determining the modal stroke width of each line and the actual stroke widths for each connected component of the text portion. The memory 22 for storing the control program may comprise either a ROM 22a or a RAM 22b.

In operation, the document containing the image is placed into and scanned by the scanner 110 to generate a serial or parallel digital data signal. The digital data signal comprises a plurality of signal portions, each portion representative of a corresponding pixel of the original image. Each pixel of the image has a location in the image and an image density. Accordingly, each signal portion of the digital data signal includes data representative of the location and image density of the corresponding pixel.

The digital data signal output by the scanner 110 is then stored in the memory 112. The memory 112 may comprise a RAM, a flash memory, a disk memory or the like. Regardless of the type of memory 112, the digital data signal is stored in the memory 112 in response to the location and image density data within each signal portion. Of course, it is understood that the digital data signal can be directly input to the general purpose digital computer 114, rather than into the intermediate memory 112. Alternately, the memory 112 can be incorporated into the general purpose digital computer 114. In any case, it is understood that the memory 112 is used to provide long-term storage of the image.

Once the operator has completed inputting documents into the scanner 110 or the system otherwise determines or is instructed that the digital data signal representative of the image stored in memory 112 should be converted to text data, the digital data signal representative of the image is output from the memory 112 to the general purpose computer 114. It is of course understood that a special purpose digital computer or hardwired logic circuit can be used in place of the general purpose digital computer 114.

Figure 3A:
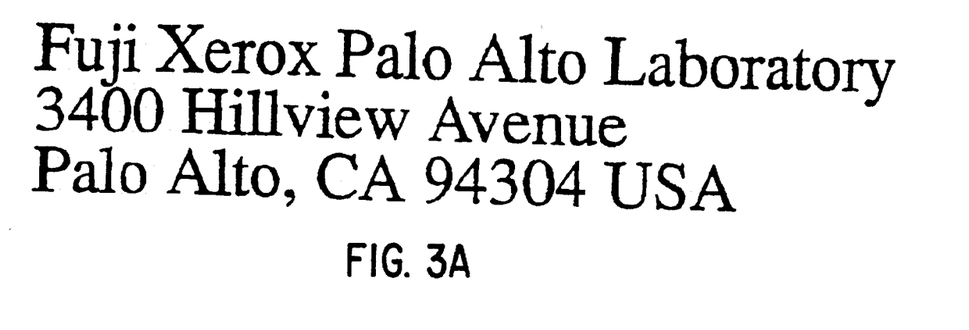
FIGS. 3a–3c show a sample text portion, the sample portion after being converted to bounding boxes, and the sample portion after vertical shrinking.

The digital image data signal stored in the memory 112 is output to the general purpose computer 114, where it is input through the input/output means 24 to an image memory 26. Once the digital data signal has been completely stored in the image memory 26, the digital data signal representing the image is output to the connected component generating means 28. The connected component generating means 28 divides the digital data signal representative of the aligned image into a plurality of connected components, each connected component comprising one or more signal portions. Each connected component comprises signal portions corresponding to those pixels of the aligned image which have a certain minimum image density and form a continuous path. Each script character generally corresponds to one connected component, as in the "F" of "Fuji" or more than one connected component, as in the "j" or "i" in "Fuji" as shown in FIG. 3(*a*). The list of connected components generated by the connected component generating means 28 is stored in the image memory 26 and/or memory 112.

Once the connected component generating means 28 generates the plurality of connected components for the aligned image from the digital data signal, the digital data signal corresponding to the image stored on the image memory 26 and the list of connected components generated by the connected component generating means 28 is output to the bounding box generating means 30.

Figure 3B:
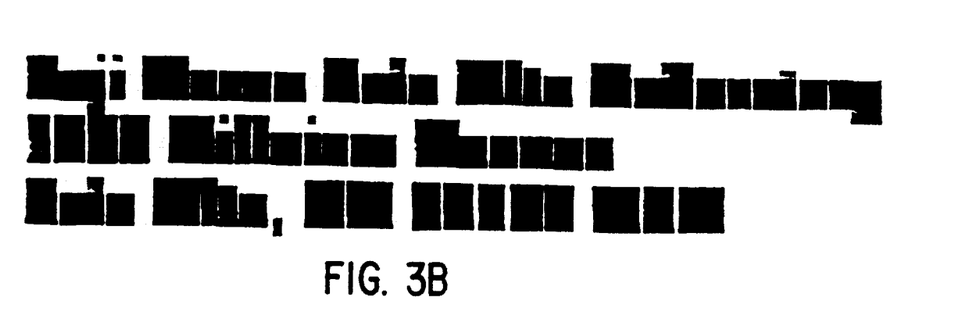

The bounding box generating means 30 redivides the digital data signal representative of the aligned image into a plurality of bounding boxes, each bounding box containing one connected component and zero, one or more signal portions of the digital data signal located adjacent to or near the signal portions comprising the connected component. These additional signal portions corresponding to the pixels of the text portion surrounding each connected component. The dimensions of each bounding box are determined by the location data of the leftmost, rightmost, uppermost and bottommost signal portions comprising the corresponding connected component. Accordingly, the signal portions within the bounding box are those comprising the connected component and those signal portions having a location data placing them within the boundaries of the bounding box, regardless of their image density data, as shown in FIG. 3(*b*) which shows the contents of the bounding boxes uniformly represented as black, or image, pixels.

Once the list of bounding boxes and the signal portions comprising each bounding box has been generated by the bounding box generating means 30, the list of bounding boxes is input to the image memory 26 or memory 112. Then, the image is output to the text orientation determining means 46, which determines the primary orientation of the image.

The text orientation determining means 46 determines whether the "line" direction is horizontal (or portrait) or whether it is vertical (or landscape). The horizontal direction is defined as parallel to the short side of the page containing the image. That is, Asian text can be set horizontally, with lines of text extending horizontally and the lines of the image extending vertically, or set vertically, with lines of text extending vertically and lines of the image extending horizontally. Likewise, Roman text can be set in a portrait orientation, similarly to Asian horizontally set text, or the text can be set in landscape orientation, which is similar to Asian vertically set text.

In the preferred embodiment, the text orientation determining means 46 determines whether the image is set horizontally using a modification of a technique described in "Automatic Inference of Text Line Orientation" by Ittner, in *Proceedings of the Symposium on Document Analysis and Information Retrieval*. Ittner's system determines the text line orientation of a document by noting that inter-character spacing is, in general, smaller than inter-line spacing. Ittner then finds the text line orientation by building a minimal spanning tree of the centers of connected components. In text documents, significantly more branches of the tree will be between adjacent characters within a text line than between adjacent characters on different lines. If the branches of the tree have a dominant direction, the text line orientation is thus reflected. In Ittner's system, the minimum spanning tree is built by constructing a Delaunay triangulation (based on a Voronoi diagram). In the present system, this step is skipped and instead, Prim's Algorithm is used to form the minimum spanning tree. Prim's Algorithm works by adding the shortest branch between a node already in the tree and a node which is not. In general, this can be computationally very expensive. Thus, the present system uses a threshold heuristic to minimize the cost. However, this results in a near-minimum spanning tree, rather than a true spanning tree. The threshold heuristic determines the distance between each pair of points. If the distance is larger than a cutoff value, which depends on a number of connected components, it is ignored. The pairs of connected components are thus sorted by distance. This near minimum spanning tree is constructed by adding the first n-1 pairs for which at least one member has not yet been added to the tree.

Figure 2A:
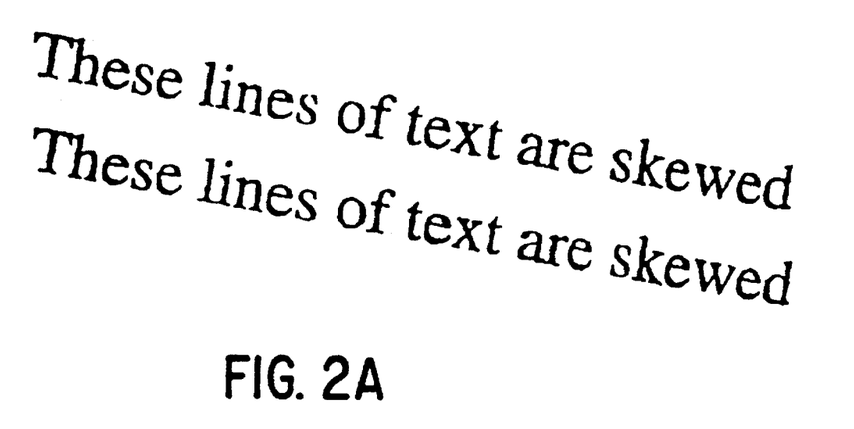
FIGS. 2a–2b show a skewed sample text portion, before and after the skew is removed.

In this way, the text orientation means 46 aligns the analysis axes roughly to the dominant axes of the image. However, determining the orientation of the dominant axes of the image may not be sufficient to align the analysis axes with the image axes. As shown in FIG. 2*a*, it may also be necessary to compensate for a global skew angle of the entire image from the horizontal image. To do this, the image axes locating means 40 imparts a rotation between the image axes and the analysis axes so that they are aligned.

This is conceptually equivalent to rotating the entire page until the image is aligned with the proper axes. However, even compensating for the dominant skew angle in an entire page image may not be sufficient adjustment to allow accurate text parameterization. That is, sometimes individual lines or small groups of lines will have a skew angle with respect to the general orientation of the entire page.

Figure 2B:
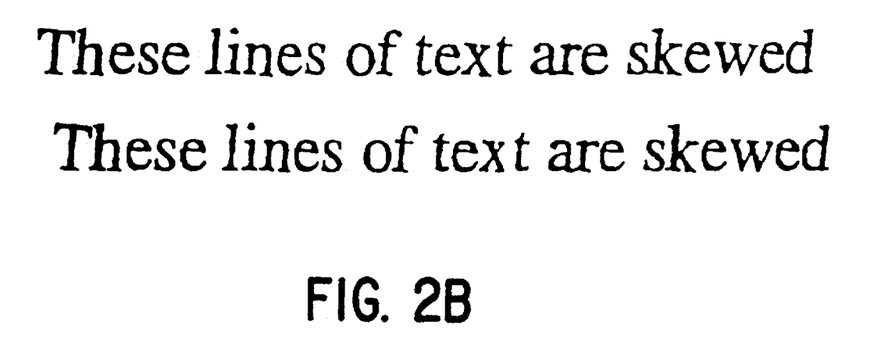

Again referring to FIG. 2a, if the skewed lines of text shown in FIG. 2a comprised not the entire image, but only a portion of the image, with the rest of the image being aligned to the dominant axes of the image page, then the connected component translating and rotating means 42 would rotate the individually skewed lines until are aligned with the dominant axes. As shown in FIG. 2b, the rotation imparted by the connected component translating and rotating means 42 results in the connected components of the image being slightly rotated relative to the dominant axes of the image. For aesthetic reasons, it might be desirable to compensate for the rotation of the individual connected components. If this is desired, it can also be performed by the connected component translating and rotating means 42. However, in practice, most algorithms applied to page images are extremely tolerant of small amounts of localized rotation, as contrasted with global skew.

The connected component translating and rotating means 42 detects and corrects for possible skew by detecting the skew angle based on the technique described in "The Skew Angle of Printed Documents" by Baird, *Proceedings 1987 Conference of the Society of Photographic Scientists and Engineers*. Once the skew angle is detected, the individual connected components are translated such that their origins are properly aligned to the image coordinate system but, as described above, any rotation of individual connected components persist.

The aligned, translated and possibly rotated bounding boxes are then output to the vertical shrinking means 32. The vertical shrinking means 32 vertically shrinks the image by removing a number of horizontally extending pixel rows of each bounding box in the image. By shrinking the vertical extent of the bounding boxes, rather than vertically splaying the bounding boxes, the centers of the bounding boxes are not displaced, while an abnormally large amount of white space (leading) between vertically aligned connected components is created. The vertical shrinking means is then able to separate the lines of the image without needing to resort to a separate coordinate system, as is the case with splaying. In addition, the vertical shrinking means, like the vertical splaying means, operates whether such splaying is needed or not. Since shrinking requires even less memory and computational resources than splaying, the system becomes even more efficient.

That is, the lines within a text portion of a document are separated by a variable amount of white space or leading, the leading being defined as a linear horizontal white path between characters of the current line and the characters of the vertically adjacent lines. Generally, Asian script-types are well behaved, and do not have ascending or descending portions of connected components. Accordingly, it is usually possible to unambiguously locate lines of text in Asian script documents without shrinking. In contrast, European script-types are not well behaved, and usually have ascending and descending portions. As these ascending and descending portions often touch or merely overlap horizontally, as shown in FIGS. 3(a) and 3(b), it is sometimes difficult to unambiguously locate lines of text in European script documents without first shrinking them in the vertical direction.

However, since the cost of shrinking, in time consumed and processing power needed, is very low (and even lower than splaying), it is simpler to vertically shrink everything regardless of the script-type (and preferably without first determining the script-type), rather than attempting to determine the script-type and/or those particular lines needing shrinking. Of course, should the cost of shrinking rise, the present invention can be easily modified to include means for determining if shrinking of a portion of the image necessary.

Figure 3C:
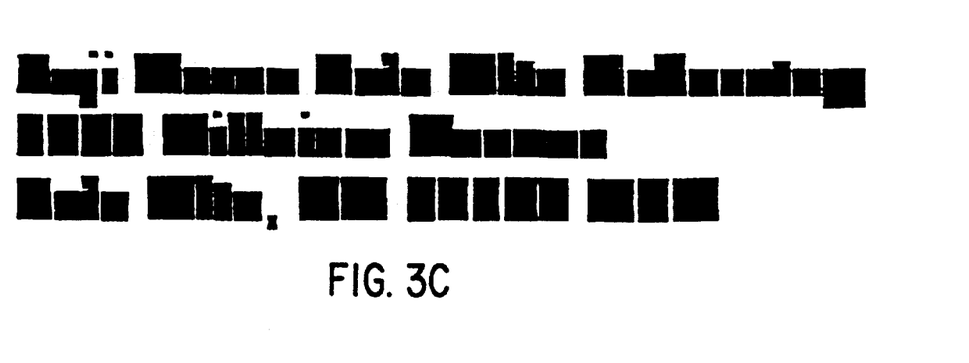

FIG. 3 shows, in part (a), a sample text portion, in FIG. 3(b), the bounding boxes surrounding each connected component of the sample text portion, and, in FIG. 3(c), vertically shrunk versions of the bounding boxes. It is clear from FIGS. 3(a) and 3(b) that the bounding box around the "j" in "Fuji" contacts the boundary box of the first "0" in "3400". However, after applying vertical shrinking to reduce the extents of the "j" and "0" connected components in the vertical direction, there is an uninterrupted white space between each pair of vertically adjacent lines, as shown in part (c) of FIG. 3.

It should be appreciated that in addition to the reduction in computation in memory resources and the avoidance of using a separate coordinate space, the vertical shrinking means can also tune the amount and limits of the shrinkage to be applied to the bounding boxes to the particular image, so that the vertical shrinking means 32 readily adapts to differing type sizes. In addition, in general, the vertical shrinking means 32 attempts to shrink the height of each bounding box by approximately 10%. The vertical shrinking means 32 also attempts to ensure that the number of pixels is remaining is odd, so that the shrinkage does not effect the center position. In addition, if any pixel rows are removed, a minimum of three rows are removed, while the resulting shrunk bounding boxes are never allowed to fall below three pixels in vertical extent. As shown in FIG. 3(c), it is now possible to draw a linear horizontal line between the first and second text lines of FIGS. 3(a) and 3(b), even though the bounding box of the "j" of the first line encroaches on the bounding box of the "0" on the second line.

After vertically shrinking the image, the vertical shrinking means 32 determines which connected components and bounding boxes comprise each line of text. That is, any connected component whose vertical center is within the bound of the text line formed by the vertically shrunk line profile is included in that line. This will lead, of course, to expansion of the line to completely include all of its connected components. Thus, the text line top and bottom positions can be accurately and unambiguously determined, even they overlap as do the first and second lines in FIGS. 3(a) and 3(b). The lists of lines and corresponding connected components are then stored in the image memory 26 and/or the memory 112.

The lists of lines and corresponding connected components and the original unshrunk signal portions comprising the image are then output to a baseline alignment means 44. Line registration or alignment is a process for aligning the baselines of the characters of a text line. The actual desired baseline is usually difficult to characterize due to the presence of descenders, such as in the letter "g" or punctuation marks, such as commas. Accordingly, the baseline alignment means 44 first calculates a modal bottom position for the connected components of a line for components which do not lie at the bottom of their respective character cells. Then, the baseline alignment means 44 aligns the baseline connected components. For example, accents, the dots over "i" and "j", and the upper components of the question mark, exclamation point, the semicolon, and the colon, are classified as non-baseline components. That is, when another connected component lies below a given connected component, the given connected component is classified as a non-baseline component.

It should be appreciated that one result of this is that quotation marks and apostrophes, which do no have any vertical aligned components lying below them, are considered to be baseline components. While this may seem to be counter-intuitive, this classification does not have any adverse effect on the performance of the system.

The baseline alignment means 44 then acts analogously to a high pass filter, in that it allows sharp discontinuities, due to descending characters being adjacent to non-descending characters, while eliminating small variations in the baseline position between character cells. For each baseline component, the baseline alignment means 44 measures and stores the relative vertical offset between the bottom of the connected component and its left-adjacent baseline component neighbor. At the beginning of a line, the baseline alignment means 44 uses the modal bottom position in place of the missing left adjacent baseline neighbor.

Figure 4A:
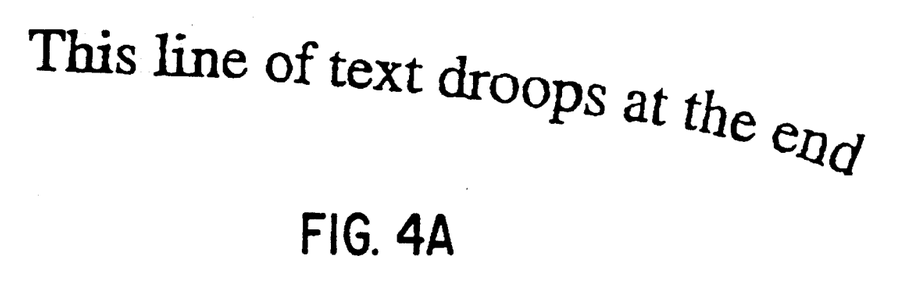
FIGS. 4a–4c shows a warped sample text portion before and after the warp is initially removed, and after the descender is aligned to the baseline.
Figure 4B:
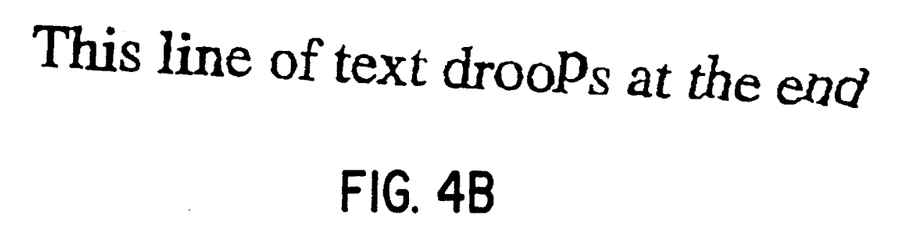
Figure 4C:
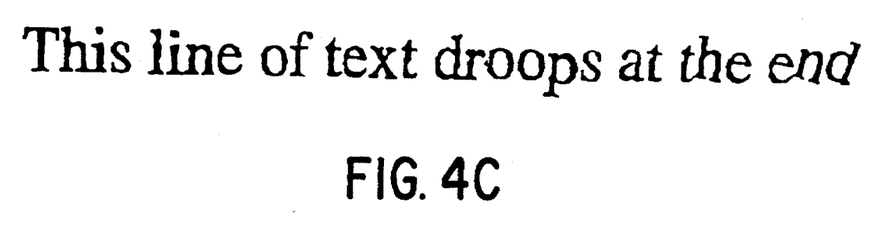
Figure 5:
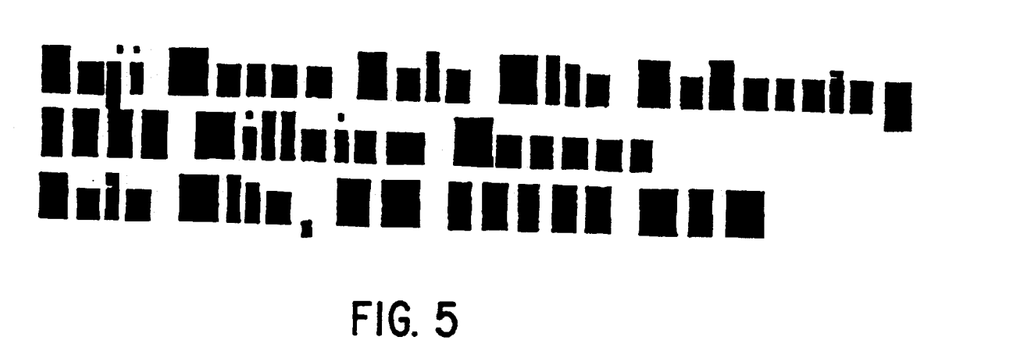
FIG. 5 shows the sample text portion of FIG. 3b after horizontal shrinking.

Then, the baseline alignment means 44 pulls the baseline connected components to the modal baseline, providing a perfect baseline alignment, but temporarily aligning the bottom of ascending characters and apostrophes to the modal baseline. On the other hand, non-baseline components are moved distances equal to their corresponding baseline components of their bounding boxes. This process is shown in FIGS. 4(a)–4(c). FIG. 4(a) shows a line of warped text which self-evidently droops at the end. As described above, all of the bottom positions of the characters comprising the line of text are aligned to the modal position, as shown in FIG. 4(b). The relative vertical offsets between neighboring characters is then recalled and applied to shift the descenders down and the apostrophes and quotation marks up, as shown in FIG. 4(c). It should also be appreciated that as with the connected component translating and rotating means 42, individual connected components are still rotated relative to the coordinate axes. It should also be appreciated that the operation of the baseline alignment means 44 and the vertical shrinking means 32 can be reversed without effecting the operation of the system.

Figure 8:
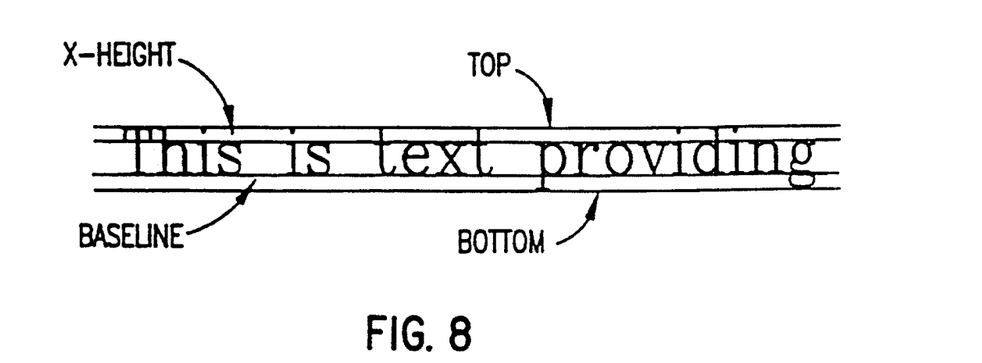
FIG. 8 shows a text string indicating the relative positoins of the text line.

Once the bounding boxes are shrunk and any warp is removed, the image is output to the vertical profile means 34. The vertical profile means 34 determines, for the unshrunk image, the top and bottom positions and the rightmost and leftmost positions of each line of text. The vertical profile means 34 first generates a vertical distribution profile of the connected components of each line of text. From the vertical distribution profile, the top and bottom positions of a line of text, as shown in FIG. 8, can be positively established.

The vertical profile means 34 then determines the uppermost and lowermost positions of the vertical profile for each line of text relative to the already-determined baseline position. The bottom point of the text line, as shown in FIG. 8, is the lowermost point of the vertical distribution profile, while the top point of the text line, as shown in FIG. 8, is the uppermost point of the vertical profile. The vertical profile means 34 then generates one additional vertical for each line of text, of only the top positions of the connected components of the line. The x-line position will then generally be the vertical position of the peak of the top position vertical distribution profiles. It is possible, in a text line with no ascending or descending connected components, that the top and the x-line positions will coincide. Further, in a text line having a high percentage of uppercase or ascending letters, it may not be possible to accurately determine the x-line position. Once all of the lines have been operated on by the vertical profile means 34, the list of lines and the bottom, top, baseline and x-line positions corresponding to each line, relative to the baseline, are output to the image memory 26. The connected components corresponding to one line of text are those connected components falling entirely between the top and bottom positions.

It should also be appreciated that not every line will contain a mixture of x-height ascender and descender characters. To compensate for this, in areas of homogeneous line size, the vertical profile means 34 computes a modal descender length, a modal x-height, and a modal ascender height for all lines. Then the vertical profile means iterates over all included lines. If a line's measured descender size is less than or equal to one half the modal descender length, then that line's descender length is set to the modal descender length. In addition, if a line's modal ascender height is no more than 20% different than the modal ascender height (that is, between 80 and 120% of the modal ascender height) and that line's x-height is less than or equal to 70% of the modal x-height, then the vertical profile means sets that line's x-height equal to the modal x-height. In particular, this works very well when dealing with lines having no descenders and lines having no x-height characters, as in a line of text such as "DETAILED DESCRIPTION OF THE PREFERRED EMBODIMENTS".

Next, the plurality of signal portions and the lists of the connected components and bounding boxes corresponding to each line of the image are output to the spatial feature determining means 36. The horizontal shrinking means 360 of the spatial feature determining means 36 horizontally shrinks the unshrunk bounding boxes, as shown in FIG. 3(b), of a single line to remove any overlaps (or inadvertently ligatures) of two or more bounding boxes corresponding to two or more independent connected components.

The horizontal shrinking means 360 operates similarly to the vertical shrinking means 32, but acts on the horizontal, rather than the vertical dimensions of each bounding box of each line of text of the image.

Generally, characters within a line of text are separated by variable amounts of white space, the white space being defined as a linear vertical white path between characters within the current line. Again, as Asian script-types are usually well behaved, it is not generally necessary to horizontally shrink the lines of an Asian script document to ensure that such white spaces between characters exist. In contrast, in proportionally spaced European scripts, while characters and words are usually separated by white space, the amount and distribution of white space within and between words is highly variable. It is often dependent on the font used, need not be precisely vertical to be recognized by humans, and may be deliberately omitted. Again, because of the extremely low cost of shrinking, it is generally neither necessary nor desirable to determine the script type of the image or whether shrinking of a particular line is necessary. However, as above, should the cost of shrinking rise, such information could be obtained.

In general, the leftmost and rightmost extents of a line are presumed to be word delimiters. It should be understood that hyphenated words would have to be reassembled by downstream processing if necessary. Within a line, spaces of significant width are found by first looking at the position of components in the line. The distribution of spaces between connected components is generally bimodal: the lower peak will correspond to the intercharacter space while the higher peak corresponds to the interword space. It should be understood that one or both of these peaks may be missing. In the first case, when the intercharacter space (or intraword space) is missing, the text may be "set tight". That is, the text will have no detectable space between characters due to kerning or poor image quality. This may be resolved by examination of the horizontally shrunken bounding boxes. In general, the heuristics applied to the process of horizontal shrinking are exactly the same as described above for vertical shrinking. In the second case, the interword space will be absent on lines containing a single words or in lines consisting solely of Asian script-types, which are set monospaced.

Next, the spacing determining means 362 examines the distribution of spaces detectable in the horizontally shrunken connected components. The highest detected peak represents the widest space. If the horizontal position of that space does not correspond to the position of an intercharacter (or interword) peak found in the initial (i.e., unshrunken) connected components, it is a word space. If it does correspond to the position of an intercharacter peak, it is presumed that there is no word space and that the line contains a single word, delimited by the line boundaries. The space between word boundaries, whether derived from line coordinates or from connected component gaps, is used as the preliminary word dimension. In a process directly analogous to the line boundary determination described above, the word boundary coordinates are determined by including all of the connecting components whose centers lie within the preliminary word dimension.

After each line of the text portion of the image is analyzed, the word spacing determining means 362 determines the character and word spaces in each line of text of the image. The word spacing determining means 362 comprises line extent determining mean 3620 for determining the left and right edges of each line, space width distribution determining means 3622 for generating a distribution of the determined space widths, and space width distribution analyzing means 3624 for analyzing the space width distribution. The space width distribution analyzing means comprises distribution peak locating means 3626 for locating peaks in the space width distribution and distribution peak analyzing means 3628 for determining of the located peaks represent interword or intraword spaces.

In operation, the beginning and ending of lines are assumed to be the beginning and ending of words. Then within a line, spaces within the horizontally shrunken text between connected components are located, and a distribution curve of the widths of the spaces is generated. The widths of the spaces are measured as the distance between the rightmost edge of a left-adjacent connected component and the left most edge of a right-adjacent connected component. Generally, the distribution curve is bimodal, with peaks representing the narrow spaces between characters within words and the wide spacing between words. Of course, it is possible that one or both peaks could be missing. If the lower peak, representing intraword spacing, is missing, the text may be "set tight". The highest peak of the distribution curve of the unsplayed text portion is compared to the distribution curve of the horizontally splayed text portion. If that peak does not correspond to an inter-character-cell spacing, it is a word space. If the upper peak is missing, or corresponds to the interword spacing, it means the line of text comprises a single word.

Figure 6A:
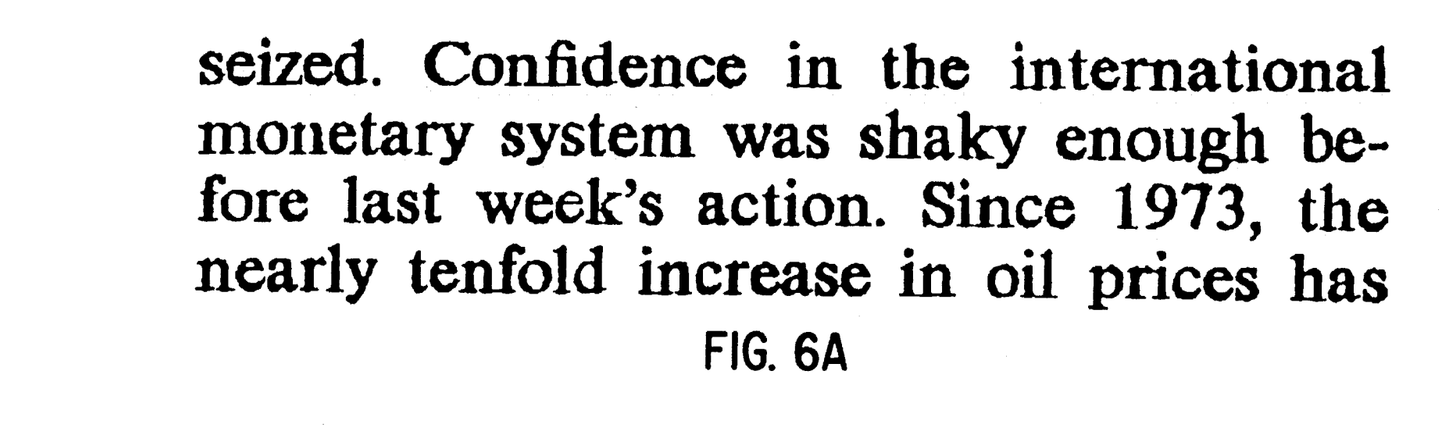
FIGS. 6a–6b show a second sample text portion before and after horizontal shrinking.

Within the spatial boundary of each word, character cells are isolated. A horizontal profile of the shrunken bounding box is generated. Vertical paths of white space between the shrunken bounding boxes divide the word into preliminary character cells extending from the line bottom up to the line top and bounded on the left and right sides by the intercharacter spaces. It should be appreciated that these preliminary cells will be later expanded to contain constituent connected components. It should also be appreciated that in a small number of instances, where the character is horizontally disjoint, such as the double quote character, some Kanji characters and some Hangul characters, more than one character cell per character will be generated. The bounding boxes, after horizontal shrinking, are shown in FIG. 6. It can readily be seen, by comparison with FIGS. 3a–3c, that segmentation of previously kerned pairs such as the "Av" in "Avenue" is easily accomplished.

Figure 6B:
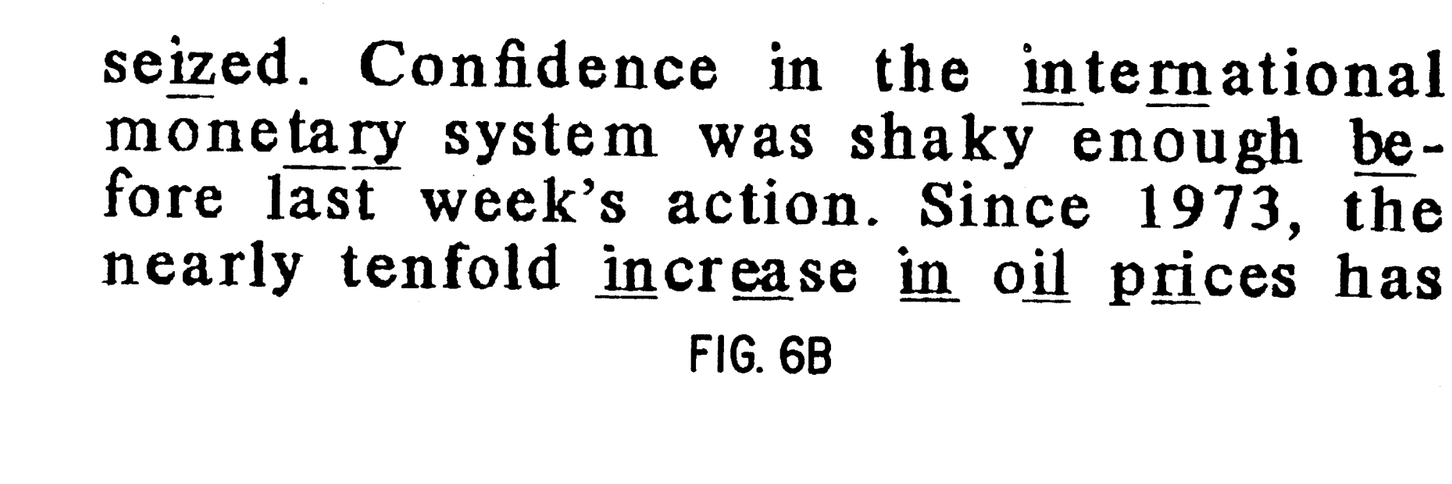

Pair kerns, which result in bounding box overlaps, occur often and are easily corrected, such as the "uj" of "Fuji" or the "Av" of "Avenue", as shown in the sample text of FIGS. 3(a) and 3(b). However, in some fonts, intentional ligatures, or connected component overlaps occur, such as the "fi" of "confidence" in FIG. 6(a). In the preferred embodiment of the present invention, the horizontal shrinking means 360 horizontally shrinks each line of the text portion to eliminate any overlaps between adjacent bounding boxes. Then each horizontally shrunken line is analyzed to locate remaining ligatures present in the line as shown in FIG. 6(b). After the located ligatures have been identified, they are analyzed to locate at most one splitting point. If a splitting point in the connected component is located, the ligature is divided into two connected components. After further shrinking the two new connected components, the connected components of the current line are rechecked to determine if any possible ligatures remain.

While the unintentional overlaps of bounding boxes are removed merely by shrinking, the horizontal shrinking is not able to remove the intentional or unintentional ligatures between connected components. These ligatures are represented by single bounding boxes, as they are identified as single connected components.

To separate the ligatures, the stroke width determining means 364 determines, for each line of text, an representative stroke width $S_w$ for that line. The average stroke width is determined by detecting the modal value of the run lengths present in the plurality of connected components associated with a particular text line. The stroke width determining means 364 comprises a wide connected component locating means 3640 for locating wide connected components over a predetermined width, cost distribution generating means 3642 for generating a cost distribution of each wide connected component, cost minima locating means 3644 for locating minima within the cost distribution, and a connected component splitting means 3646 for splitting a single connected component into two connected components at a located minimum.

Figure 7A:
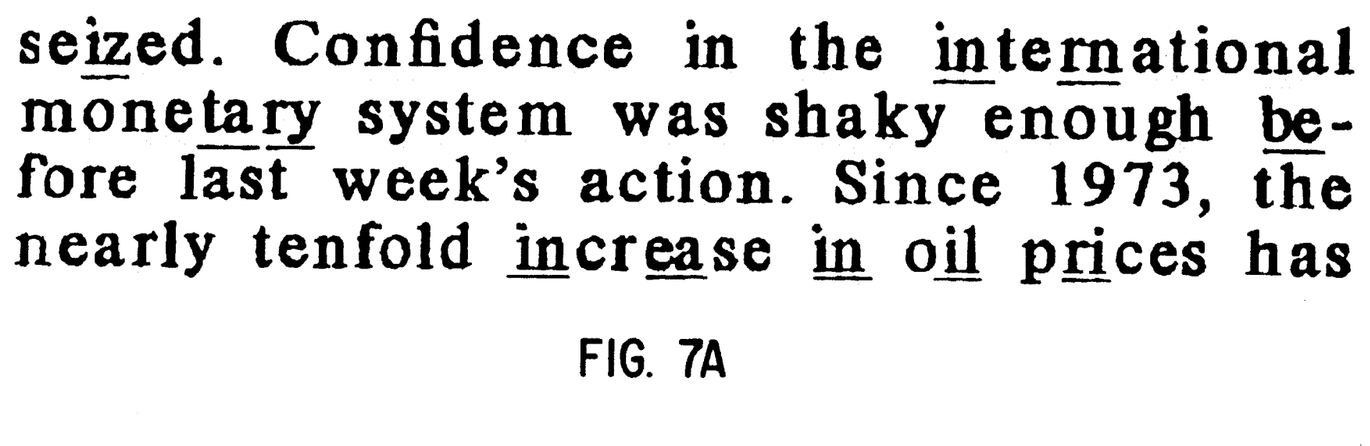
FIGS. 7a–7b show the second sample text portion before and after connected component splitting.
Figure 7B:
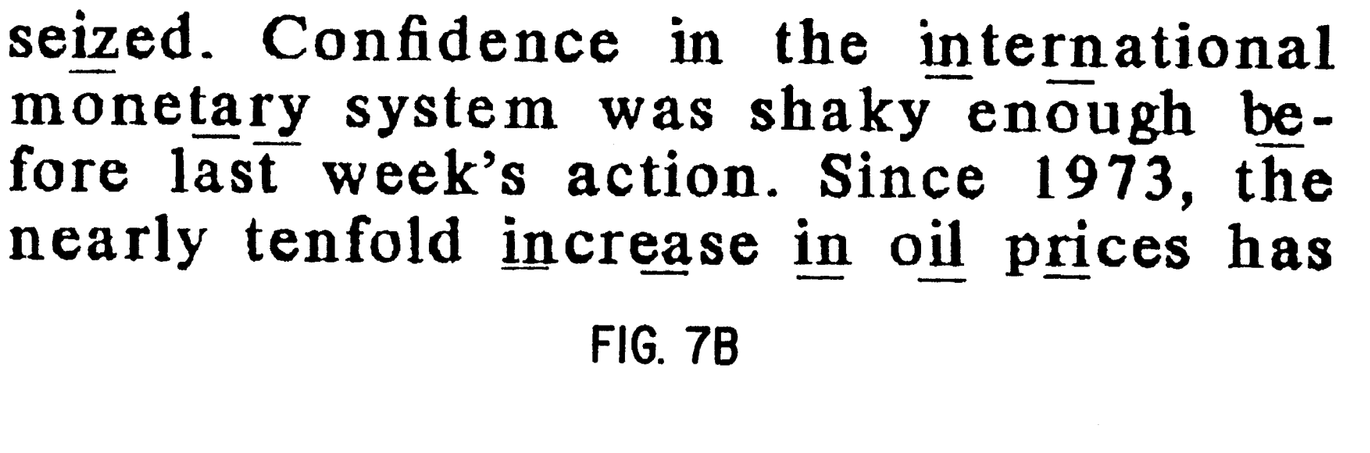

In operation, each connected component within a line having a width $C_w$ more than three times the representative stroke width $S_w$ is identified and processed. To process a connected component having a width $C_w$ at least three times the stroke width $S_w$, each column of that connected component is ANDed with each adjacent column and the number of "on" pixels of the ANDed columns is determined, to generate a cost distribution one pixel narrower than the connected component. The cost distribution is then analyzed to locate minima. For at most one minimum (preferentially the leftmost minimum if there are 2 or more minima having the same value) having a value less than the representative stroke width $S_w$ and located both more than 1.5 times the stroke width $S_w$ to the right of the left boundary and to the left of the right boundary of the corresponding bounding box the connected component is split into two connected components. This is recursively applied to each resulting fragment until all the fragments have been rechecked and resplit if necessary. As is shown in FIG. 7(b), if the ligature is intentional, like the "fi" in "confidence", there will often be no minimum found. In this case, the ligature will be treated as a single character.

Because the method and apparatus of the present invention are statistically based, they are very robust and can withstand even a very poorly printed and/or scanned document. That is, it is not necessary for the digital data signal or the connected components generated from the digital data signal to perfectly represent every character of the document. Rather, the present invention is able to withstand such common scanning errors such as splitting a single connected component character into two or more connected components or merging two or more separate connected components into a single connected component.

Figure 10:
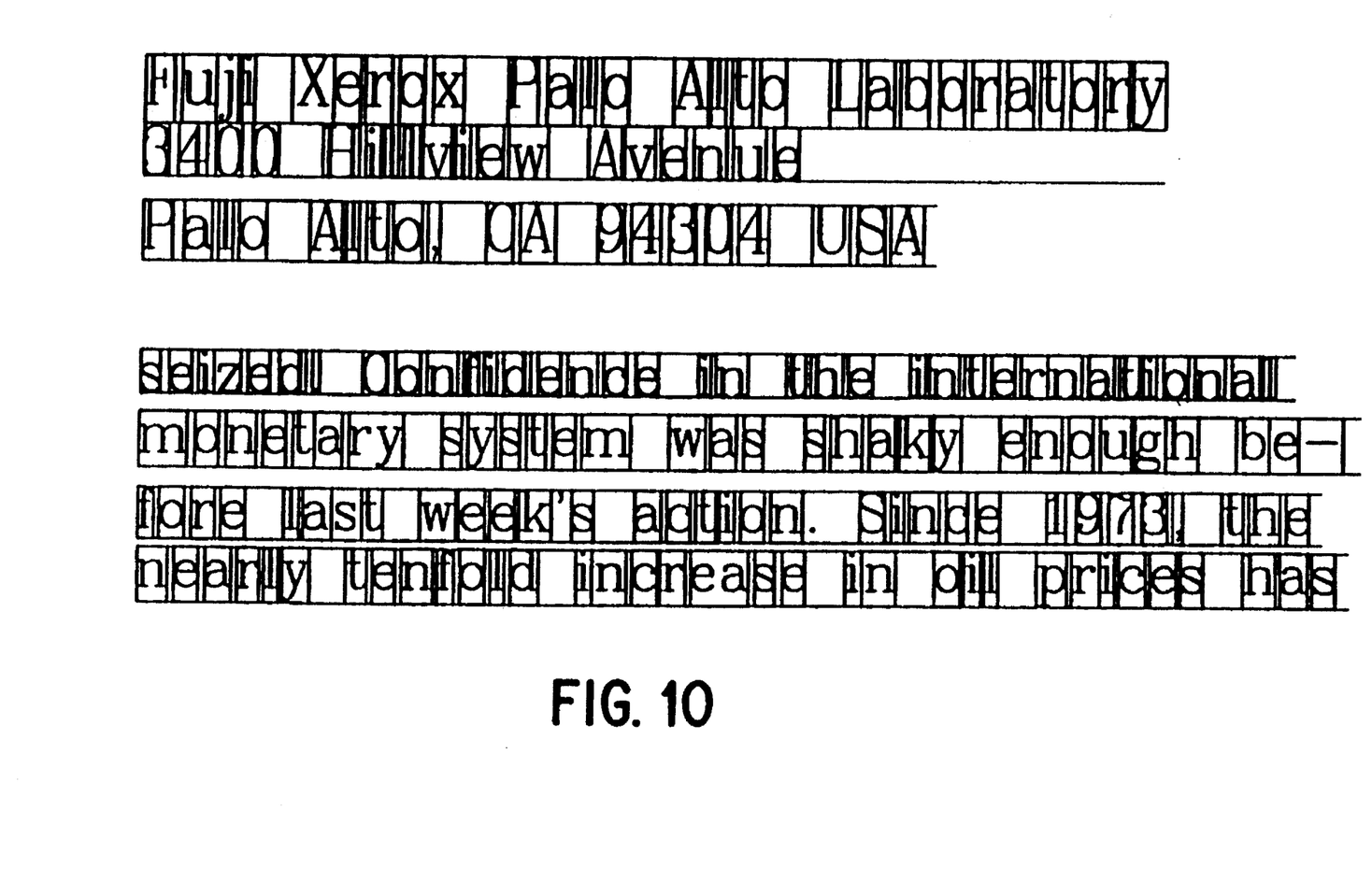
FIG. 10 shows the text sample of FIG. 6 with the character cells and bounding boxes shown.

The horizontally shrunk text is then output to the character cell generating means 38 for generating the character cells within each line of text. For each set of one or more vertically aligned (i.e. horizontally overlapping) connected components, a character cell enclosing the unshrunk connected components is formed by the character cell generating means 38. The dimensions of each character cell will extend from the top position to the bottom position of the corresponding line of text, and from the leftmost position of the connected components of the character cell to the rightmost position of the connected components of the character cell, as shown in FIG. 10.

Figure 9A:
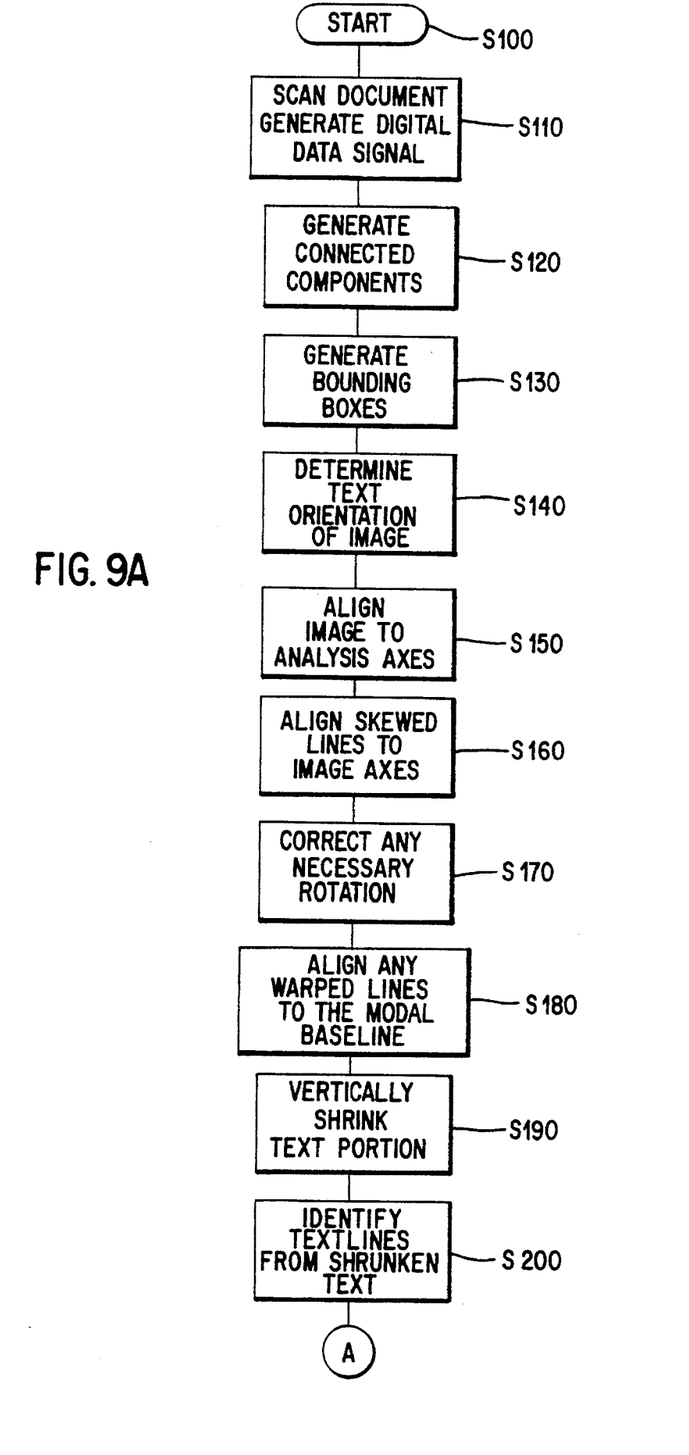
FIGS. 9A and 9B are a flow chart of the spatial feature determination method of the present invention.
Figure 9B:
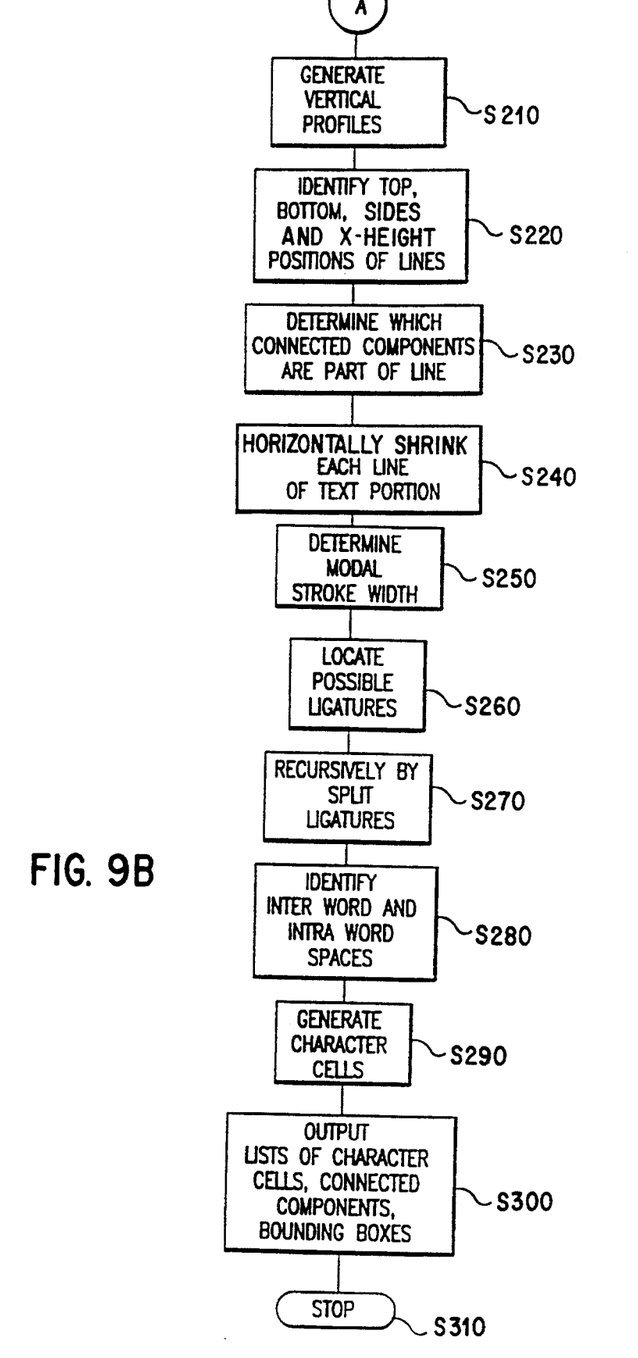

A simplified flowchart of the operation of the script determining system set forth above is shown in FIG. 9. In step S100, the system starts, and the document is scanned in step S110 to generate the digital data signal. In step 120, the connected components of the digital image data signal are identified. In step S130, the bounding boxes for each of the determined connected components are generated. The image is then cleaned up by determining the text orientation in step S140, and the dominant image axes in step S150. Then, in step S160, any remaining lines which are skewed to the dominant image axes are aligned with the dominant image axes. Furthermore, in step S170, any characters which need rotational correction are rotated so that they maximally align with the dominant image axes. Next, in step S180, any warped text lines are iteratively aligned to the modal baseline.

Next, in step S190, the text portion is vertically shrunk. In step S200, the lines of text are identified from the shrunk text. In step S210, the vertical profiles of each line are generated and the top, bottom, leftmost, rightmost and (possibly) the x-height positions are determined relative to the already determined baseline in step S220. In step S230, the connected components and bounding boxes corresponding to each line are identified.

Then, in step S240, the each line of the original image is horizontally shrunk. In step S250, the modal stroke width is determined for each line, and in step S260 possible ligatures in the text portion are located. In step S270, the located ligatures are recursively split to their constituent independent connected components. In step S280, the character and word spaces within each line are identified. In step S290, the character cells of each line are identified and their dimensions determined. In step S300, the lists of character cells, corresponding bounding boxes and connected components are output. Then, in step S310, the process stops.

While the invention has been described with reference to particular preferred embodiments, the invention is not limited to the specific examples given, and other embodiments and modifications can be made by those skilled in the art without the departing from spirit and scope of the invention and claims.

What is claimed is:

1. An automatic text feature determining system for determining a text feature of an unsplayed text portion of an image of a document, comprising:

input means for inputting a digital data signal representative of the unsplayed text portion, the digital data signal comprising a plurality of signal portions, each signal portion corresponding to one of a plurality of pixels of the image;

connected component generating means for generating a plurality of connected components from the plurality of signal portions;

aligning means for aligning the connected components to analysis axes, the aligning means comprising,
        text orientation determining means for determining a dominant text orientation direction of the unsplayed text portion,
        axes aligning means for aligning the dominant direction of the unsplayed text portion to the analysis axes, and
        line aligning means for aligning skewed portions of the unsplayed text portion to the analysis axes;

bounding box generating means for generating a plurality of bounding boxes, each bounding box surrounding a corresponding one of the plurality of connected components; and line spatial feature determining means for determining spatial features of each line of text of the unsplayed text portion, each line of text comprising at least one of the plurality of connected components.

2. The automatic text feature determining system of claim 1, wherein the line spatial feature determining means comprises:

vertical shrinking splaying means for generating a vertically splayed text portion from the text portion, and vertical profile means for generating a vertical profile of the vertically splayed text portion.

3. The automatic text feature determining system of claim 2, wherein the line spatial feature determining means further comprises line content determining means for determining which ones of the plurality of connected components correspond to each line of the text portion.

4. The automatic text feature determining system of claim 3, wherein the vertical profile means further comprises vertical position determining means for determining a top position, a bottom position and an x-line position based on the plurality of connected components corresponds to each line of the text portion.

5. The automatic text feature determining system of claim 4, wherein the vertical position determining means determines the top and bottom positions of each line from the corresponding vertical profile.

6. The automatic text feature determining system of claim 4, wherein the vertical profile means further comprises vertical profile generating means for generating a top position vertical profile of the top positions of the corresponding plurality of connected components.

7. The automatic text feature determining system of claim 6, wherein the vertical profile means determines the x-line position of each line of the text portion from a peak of the top position vertical profile, corresponding to each line.

8. The automatic text feature determining system of claim 1, wherein the line spatial feature determining means comprises word spatial feature determining means for determining word spatial features of each line.

9. The automatic text feature determining system of claim 8, wherein the word spatial feature determining means comprises:
   horizontal splaying means for horizontally splaying each line of the text portion;
   space width determining means for determining space widths of the horizontally splayed text portion between adjacent connected components of each line; and
   character cell generating means for generating at least one character cell within each line of the text portion based on the horizontally splayed text, each character cell comprising a group of at least one vertically aligned connected component of the horizontally splayed text portion.

10. The automatic text feature determining system of claim 8, wherein the word spatial feature determining means further comprises:
    stroke width determining means for determining a modal stroke width for each at least one line;
    means for locating wide connected components of the text portion having widths greater than a predetermined multiple of the modal stroke width for the corresponding line;
    means for generating a cost distribution for each wide connected component;
    means for locating minima within the cost distributions, each cost distribution corresponding to a predetermined portion of one of the wide connected components; and
    means for splitting each wide connected component for which at least one minimum is located into two independent connected components of the text portion.

11. The automatic text feature determining system of claim 10, wherein the predetermined multiple is 3.

12. The automatic text feature determining system of claim 10, wherein the predetermined portion of each wide connected component extends from a first point which is a second predetermined multiple of the modal stroke width to the right of a leftmost position of the wide connected component to a second point which is the second predetermined multiple of the average stroke width to the left of a rightmost position of the wide connected component.

13. The automatic text feature determining system of claim 12, wherein the second predetermined multiple is 1.5.

14. The automatic text feature determining system of claim 10, wherein the minimum is less than a predetermined value.

15. The automatic text feature determining system of claim 14, wherein the predetermined value is equal to the modal stroke width.

16. The automatic text feature determining system of claim 10, wherein the horizontal shrinking means generates the cost distribution by ANDing adjacent columns of the shrunken bounding box corresponding to the wide connected component.

17. The automatic text feature determining system of claim 9, wherein the character cell generating means determines, for each character cell, a leftmost position of the corresponding group of at least one vertically aligned connected component and a rightmost position of the corresponding at least one vertically aligned connected component, wherein boundaries of each character cell of each line comprise the leftmost position and the rightmost position of the corresponding group of vertically aligned connected components and the top and bottom positions of the corresponding line.

18. The automatic text feature determining system of claim 9, wherein the line spatial feature determining means further comprises word spacing determining means for determining intraword and interword spacing, the word spacing determining means comprising:
    means for determining a line beginning position and a line ending position;
    means for determining sizes of spaces between connected components of each line of the shrunken text;
    means for determining a distribution of space sizes; and
    means for locating at least one peak in the space size distribution.

19. The automatic text feature determining system of claim 18, wherein the word spacing determining means further comprising:
    means for determining whether each at least one peak for each line represents one of an interword space and an intraword space; and
    means for determining whether each at least one space in each line represents one of an interword space and intraword space, based on the corresponding peak determination.

20. The automatic text feature determining means of claim 1, wherein the aligning means comprises baseline aligning means for aligning a baseline of each line of text of the text portion to a corresponding modal baseline.

21. An method for automatically determining text features of an unsplayed text portion of an image of a document, comprising the steps of:
    inputting a digital data signal representative of the unsplayed text portion, the digital data signal comprising a plurality of signal portions, each signal portion corresponding to one of a plurality of pixels of the image;
    generating a plurality of connected components from the plurality of signal portions;
    aligning the connected components to the analysis axes, the aligning step comprising,
        determining a dominant text orientation direction of the text portion,
        aligning the dominant text direction to the analysis axes, and
        aligning skewed portion of the text portion to the analysis axes;
    generating a plurality of bounding boxes, each bounding box surrounding a corresponding one of the plurality of connected components; and
    determining spatial features of each line of text of the unsplayed text portion, each line of text comprising at least one of the plurality of connected components.

22. The method for automatically determining text features of claim 21, further comprising the steps of:
    generating a vertically splayed text portion from the unsplayed text portion, and
    generating a vertical profile of the vertically splayed text portion.

23. The method for automatically determining text features of claim 22, wherein the step of generating a vertically splayed text portion comprises the steps of:
    deleting an odd number of horizontal rows of pixels from each of the bounding boxes of the splayed text portion having at least a predetermined number of horizontal rows of pixels; and determining which ones of the plurality of connected components correspond to each line of the splayed text portion.

24. The method for automatically determining text features of claim 23, wherein the step of generating the vertical profile comprises the step of determining, for each text portion, a top position, a bottom position and an x-line position based on the corresponding ones of the plurality of connected components for each line.

25. The method for automatically determining text features of claim 24, wherein the step of determining determines the top and bottom positions of each line from a maximum peak and a minimum peak, respectively of the vertical profile corresponding to each line.

26. The method for automatically determining text features of claim 25, wherein the step of generating the vertical profile further comprises the step of generating a top position vertical profile of the top positions of the corresponding ones of the plurality of connected components.

27. The method for automatically determining text features of claim 26, wherein the step of determining determines the x-line position of each line from a peak of the top position vertical profile corresponding to each line.

28. The method for automatically determining text features of claim 21, further comprising the step of determining word spatial characteristics of each line.

29. The method for automatically determining text features of claim 28, further comprising the steps of:

horizontally splaying each at least one line of the unsplayed text portion;

determining space widths of the horizontally splayed text portion between adjacent connected components of each line; and generating at least one character cell of each line of the unsplayed text portion based on the horizontally splayed text, each character cell comprising a group of at least one vertically aligned connected component of the horizontally splayed text portion.

30. The method for automatically determining text features of claim 29, wherein the step of horizontally splaying further comprises the steps of:

determining a modal stroke width for each at least one line;

locating wide connected components of the text portion having widths greater than a predetermined multiple of the modal stroke width for the corresponding line;

generating a cost distribution for each wide connected component;

locating cost minima within the cost distributions, each cost distribution corresponding to a predetermined portion of one of the wide connected components; and splitting each wide connected component for which at least one cost minimum is located into two independent connected components.

31. The method for automatically determining text features of claim 30, wherein the predetermined multiple is 3.

32. The method for automatically determining text features of claim 30, wherein the predetermined portion of each wide connected component extends from a first point which is a second predetermined multiple of the modal stroke width to the right of a leftmost position of the wide connected component to a second point which is the second predetermined multiple of the average stroke width to the left of a rightmost position of the wide connected component.

33. The method for automatically determining text features of claim 32, wherein the second predetermined multiple is 1.5.

34. The method for automatically determining text features of claim 30, wherein the at least one cost minimum is less than a predetermined value.

35. The method for automatically determining text features of claim 34, wherein the predetermined value is equal to the modal stroke width.

36. The method for automatically determining text features of claim 31, wherein the step of generating the cost distribution comprises ANDing adjacent columns of the bounding box corresponding to the wide connected component.

37. The method for automatically determining text features of claim 29, wherein the step of generating character cells comprises the step of determining, for each character cell, a leftmost position of the corresponding group of at least one vertically aligned connected component and a rightmost position of the corresponding at least one vertically aligned connected component, wherein boundaries of each character cell of each line comprise the leftmost position and the rightmost position and the top and bottom positions of the corresponding line.

38. The method for automatically determining text features of claim 29, wherein the step of determining space widths comprises the steps of:

determining a line beginning position and a line ending position;

determining sizes of spaces between connected components of each line of the splayed text;

determining a distribution of space sizes; and locating at least one peak in the space size distribution.

39. The method for automatically determining text features of claim 38, wherein the step of determining space widths further comprises the steps of:

determining whether each at least one peak for each line represents one of an interword space and an intraword space; and determining whether each at least one space in each line represents one of an interword space and intraword space, based on the corresponding peak determination.

40. The method for automatically determining text features of claim 21, wherein the step of aligning the connected comprises the further step of aligning a baseline of each line of text portion to a corresponding modal baseline.

* * * * *